US008638854B1

(12) United States Patent
Bankoski et al.

(10) Patent No.: US 8,638,854 B1
(45) Date of Patent: Jan. 28, 2014

(54) APPARATUS AND METHOD FOR CREATING AN ALTERNATE REFERENCE FRAME FOR VIDEO COMPRESSION USING MAXIMAL DIFFERENCES

(75) Inventors: James Bankoski, Wynantskill, NY (US); Adrian Grange, Cambridgeshire (GB); Paul Wilkins, Cambridge (GB)

(73) Assignee: Google Inc., Mountain View, CA (US)

( * ) Notice: Subject to any disclaimer, the term of this patent is extended or adjusted under 35 U.S.C. 154(b) by 361 days.

(21) Appl. No.: 13/081,668

(22) Filed: Apr. 7, 2011

(51) Int. Cl.
*H04N 7/12* (2006.01)
(52) U.S. Cl.
USPC .................................................. 375/240.14
(58) Field of Classification Search
None
See application file for complete search history.

(56) References Cited

U.S. PATENT DOCUMENTS

2010/0061461 A1* 3/2010 Bankoski et al. ........ 375/240.16
2010/0086027 A1* 4/2010 Panchal et al. ........... 375/240.12

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.
"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.
"Overview; VP7 Data Format and Decoder". Version 1.5. On2 Technologies, Inc. Dated Mar. 28, 2005.
"Series H: Audiovisual and Multimedia Systems; Infrastructure of audiovisual services—Coding of moving video; Advanced video coding for generic audiovisual services". H.264. Amendement 1: Suppport of additional colour spaces and removal of the High 4:4:4 Profile. International Telecommunications Union. Dated Jun. 2006.
"VP6 Bitstream & Decoder Specification". Version 1.02. On2 Technologies, Inc. Dated Aug. 17, 2006.
"Series H: Audiovisual and Multimedia Systems; Infrastructure of audiovisual services—Coding of moving video". H.264. Amendment 2: New profiles for professional applications. International Telecommunication Union. Dated Apr. 2007.
"VP6 Bitstream & Decoder Specification". Version 1.03. On2 Technologies, Inc. Dated Oct. 29, 2007.
"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

(Continued)

*Primary Examiner* — Sath V Perungavoor
*Assistant Examiner* — Kate Luo
(74) *Attorney, Agent, or Firm* — Young Basile Hanlon & Macfarlane P.C.

(57) ABSTRACT

Apparatuses and methods for compressing a video signal having at least one frame with at least one block of pixel data are disclosed. A target block is selected, and an alternate reference block that is a predictor for blocks of a sequence of frames is compared to a predictor block to determine whether to create a second alternate reference block as a predictor. When a difference between the alternate reference block and the predictor block is less than a threshold, certain blocks from the sequence of frames that are more different from the first alternate reference block than other non-selected blocks are selected, and the second alternate reference block is created using the selected blocks. In this way, a predictor block that is different from a golden frame predictor is made available when an existing alternate reference block is too similar to the golden frame predictor to be useful.

18 Claims, 8 Drawing Sheets

(56) References Cited

OTHER PUBLICATIONS

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

\* cited by examiner

APPARATUS AND METHOD FOR CREATING AN ALTERNATE REFERENCE FRAME FOR VIDEO COMPRESSION USING MAXIMAL DIFFERENCES

TECHNICAL FIELD

The present invention relates in general to video encoding and decoding.

BACKGROUND

An increasing number of applications today make use of digital video for various purposes including, for example, remote business meetings via video conferencing, high definition video entertainment, video advertisements, and sharing of user-generated videos. As technology is evolving, users have higher expectations for video quality and expect high resolution video even when transmitted over communications channels having limited bandwidth.

To permit higher quality transmission of video while limiting bandwidth consumption, a number of video compression schemes are noted including formats such as VPx, promulgated by Google Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

These compression schemes may use prediction techniques to minimize the amount of data required to transmit video information. Prediction techniques can allow for multiple past transmitted frames and future frames to be transmitted out of order and used as potential reference frame predictors for macroblocks in a frame. For example, video compression schemes, such as the MPEG or H.264 standard allow for transmission of frames out of order and use them to produce better predictors by use of forward or bidirectional prediction. Further, for example, the H.264 video compression standard allows for multiple past reference frames to be used as a predictor.

SUMMARY

Systems, apparatuses and methods for encoding and decoding a video signal are disclosed. In accordance with one aspect of the disclosed embodiments, a method is provided for compressing a video signal having at least one frame with at least one block of pixel data. One exemplary method comprises selecting a target block in a target frame to be compressed using a processor, obtaining a first alternate reference block associated with the target block, the first alternate reference block available as a predictor for blocks of a sequence of frames and the sequence of frames defining an alternate reference period, comparing the first alternate reference block to a predictor block associated with the target block to determine whether to create a secondary alternate reference block, and, when a difference between the first alternate reference block and the predictor block is less than a threshold, selectively creating the secondary alternate reference block by selecting certain blocks from the sequence of frames that are more different from the first alternate reference block than other non-selected blocks from the sequence of frames, and creating the second alternate reference block using the selected blocks, the secondary alternate reference block available as a predictor for the blocks of the sequence of frames.

One embodiment of an apparatus for compressing a video signal having at least one frame with at least one block of pixel data taught herein comprises means for selecting a target block in a target frame to be compressed, means for obtaining a first alternate reference block associated with the target block, the first alternate reference block available as a predictor for blocks of a sequence of frames and the sequence of frames defining an alternate reference period, means for comparing the first alternate reference block to a predictor block associated with the target block to determine whether to create a secondary alternate reference block, and means for selectively creating the secondary alternate reference block when a difference between the first alternate reference block and the predictor block is less than a threshold. In this embodiment, the selectively selecting means includes means for selecting certain blocks from the sequence of frames that are more different from the first alternate reference block than other non-selected blocks from the sequence of frames and means for creating the second alternate reference block using the selected blocks, the secondary alternate reference block available as a predictor for the blocks of the sequence of frames.

Another apparatus for compressing a video signal having at least one frame with at least one block of pixel data taught herein comprises a memory and a processor configured to execute instructions stored in the memory. The instructions select a target block in a target frame to be compressed, obtain a first alternate reference block associated with the target block, the first alternate reference block available as a predictor for blocks of a sequence of frames and the sequence of frames defining an alternate reference period, compare the first alternate reference block to a predictor block associated with the target block to determine whether to create a secondary alternate reference block, and, when a difference between the first alternate reference block and the predictor block is less than a threshold, compare those blocks of the sequence of frames associated with the predictor block to select a block that is maximally different from the predictor block, open a list of blocks including the maximally different block, compare remaining blocks of the sequence of frames associated with the predictor block to the predictor block and to the maximally different block, add any block of the remaining blocks to the list of blocks when that block is more similar to the maximally different block than the predictor block, and create the second alternate reference block using the at least certain blocks of the list of blocks when a number of blocks in the list of blocks is higher than a predetermined value, the secondary alternate reference block available as a predictor for the blocks of the sequence of frames.

Variations of these methods and apparatuses and details of other aspects and embodiments are described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
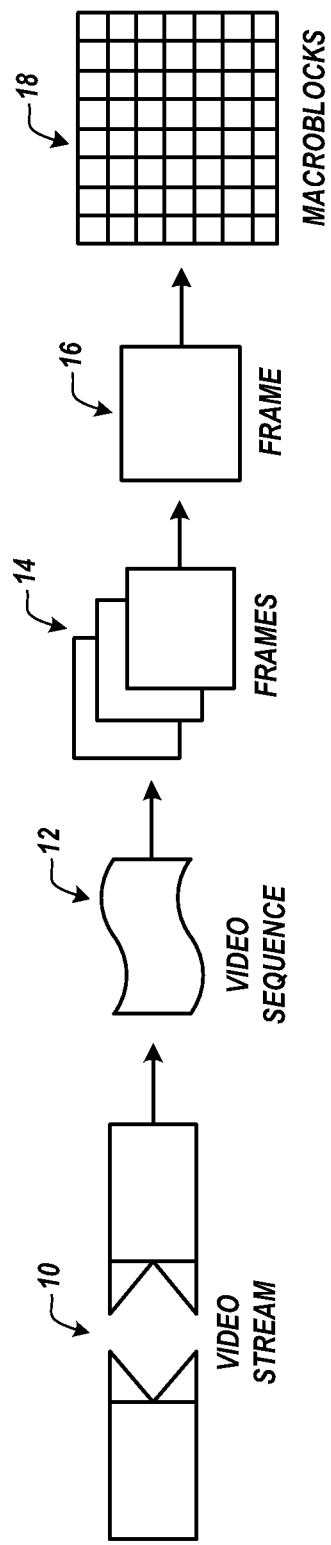
FIG. 1 is a diagram of a video bitstream.

FIG. 1 is a diagram a typical video bitstream 10 to be encoded and decoded. Video coding formats, such as VP8 or H.264, provide a defined hierarchy of layers for video stream 10. Video stream 10 includes a video sequence 12. At the next level, video sequence 12 consists of a number of adjacent frames 14, which can then be further subdivided into a single frame 16. At the next level, frame 16 can be divided into a series of blocks or macroblocks 18, which can contain data corresponding to, for example, a 16×16 block of displayed pixels in frame 16. Each macroblock can contain luminance and chrominance data for the corresponding pixels. Macroblocks 18 can also be of any other suitable size such as 16×8 pixel groups or 8×16 pixel groups. Herein, unless otherwise stated, the terms macroblocks and blocks are used interchangeably.

Figure 2:
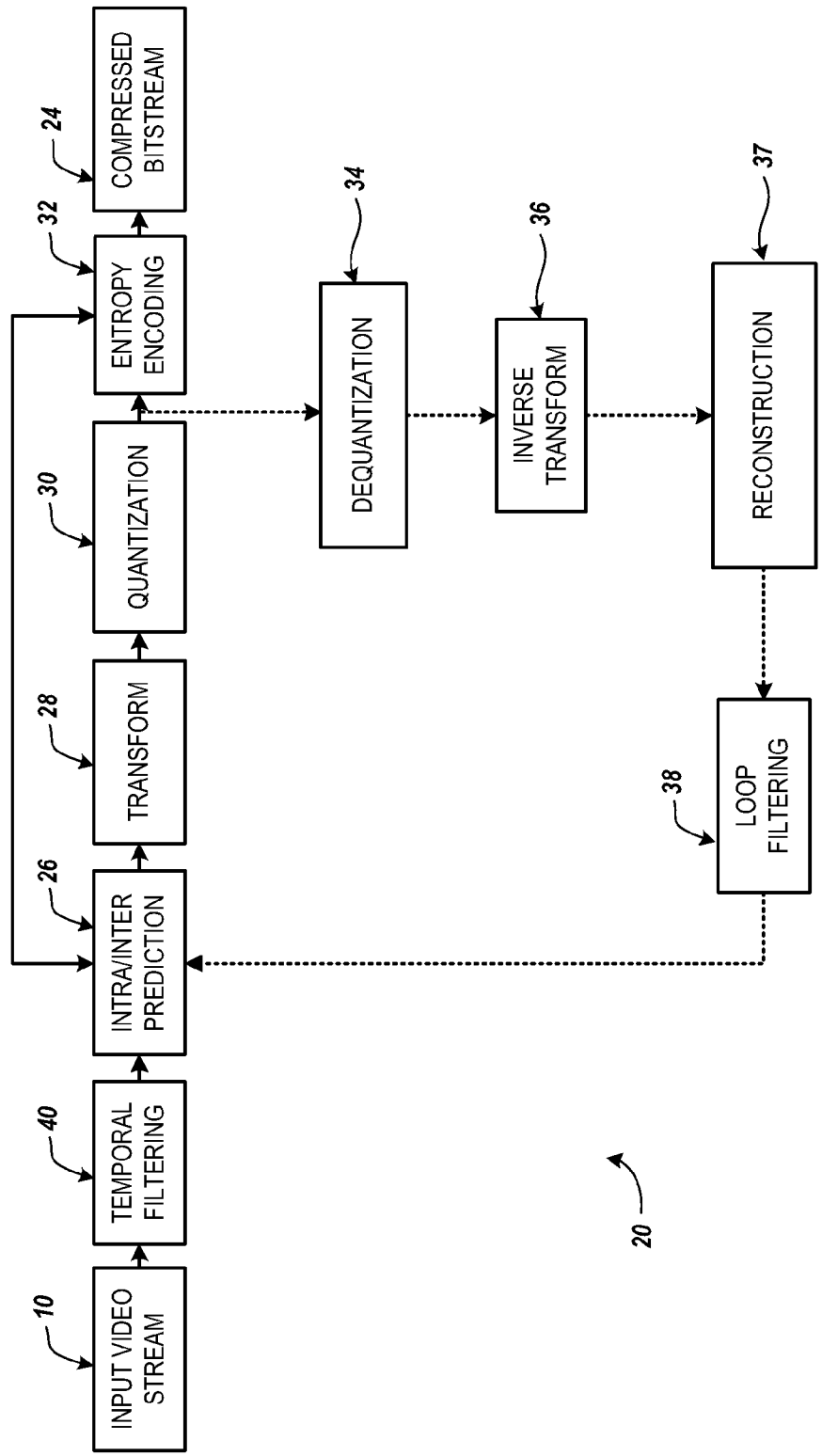
FIG. 2 is a block diagram of a video compression system in accordance with one embodiment.

FIG. 2 is a block diagram of a video compression system in accordance with one embodiment. An encoder 20 encodes an input video stream 10. Encoder 20 has the following stages to perform the various functions in a forward path (shown by the solid connection lines) to produce an encoded or a compressed bitstream 24: a temporal filter stage 40, an intra/inter prediction stage 26, a transform stage 28, a quantization stage 30 and an entropy encoding stage 32. Encoder 20 also includes a reconstruction path (shown by the dotted connection lines) to reconstruct a frame for encoding of further macroblocks. Encoder 20 has the following stages to perform the various functions in the reconstruction path: a dequantization stage 34, an inverse transform stage 36, a reconstruction stage 37 and a loop filtering stage 38. Other structural variations of encoder 20 can be used to encode input video stream 10.

Encoder 20 includes a temporal filter 40, which as shown in FIG. 2 can be included with the intra/inter prediction stage 26. Temporal filter 40 can be used to synthesize a reference or alternate predictor frame. One implementation of temporal filter 40 is discussed later. The parameters of the temporal filter 40 can be adjusted to create a reduced-noise frame for use as a predictor during the encoding process. This adjustment process can permit the filtering to take into account contextual information (such as, for example, coding modes) and other input to establish the degree of correlation between adjacent frames to filter noise from a common underlying signal. The process can be applied at the full-frame, macroblock or any other segmentation of the frame where the degree of spatial correlation between frames can be established.

When input video stream 10 is presented for encoding, each frame 16 within input video stream 10 is processed in units of macroblocks. At intra/inter prediction stage 26, each macroblock can be encoded using either intra-frame prediction (i.e., within a single frame) or inter-frame prediction (i.e. from frame to frame). In either case, a prediction macroblock can be formed. In the case of intra-prediction, a prediction macroblock can be formed from samples in the current frame that have been previously encoded and reconstructed. In the case of inter-prediction, a prediction macroblock can be formed from samples in one or more previously constructed reference frames as described in additional detail herein.

Next, still referring to FIG. 2, the prediction macroblock can be subtracted from the current macroblock at stage 26 to produce a residual macroblock (residual). Transform stage 28 transforms the residual into transform coefficients in, for example, the frequency domain, and quantization stage 30 converts the transform coefficients into discrete quantum values, which are referred to as quantized transform coefficients or quantization levels. The quantized transform coefficients are then entropy encoded by entropy encoding stage 32. The entropy-encoded coefficients, together with the information required to decode the macroblock, such as the type of prediction used, motion vectors, and quantizer value, are then output to compressed bitstream 24.

The reconstruction path in FIG. 2 is present to ensure that both encoder 20 and a decoder 42 (described below) use the same reference frames to decode compressed bitstream 24. The reconstruction path performs functions that are similar to functions that take place during the decoding process that are discussed in more detail below, including dequantizing the quantized transform coefficients at dequantization stage 34 and inverse transforming the dequantized transform coefficients at an inverse transform stage 36 in order to produce a derivative residual macroblock (derivative residual). At reconstruction stage 37, the prediction macroblock that was predicted at intra/inter prediction stage 26 can be added to the derivative residual to create a reconstructed macroblock. A loop filter 38 can then be applied to the reconstructed macroblock to reduce distortion such as blocking artifacts.

Other variations of encoder 20 can be used to encode compressed bitstream 24. For example, a non-transform based encoder can quantize the residual signal directly without transform stage 28. In another embodiment, an encoder may have quantization stage 30 and dequantization stage 34 combined into a single stage.

The encoding process shown in FIG. 2 can include two iterations or "passes" of processing the video data. The first pass can be carried out by encoder 20 using an encoding process that is less computationally intensive, and that gathers and stores information about input video stream 10 for use in the second pass. In the second pass, encoder 20 uses this information to optimize final encoding of compressed bitstream 24. For example, encoder 20 may use this information to select parameters for encoding, locating key-frames and selecting coding modes used to encode macroblocks 18, and allocating the number of bits to each frame. The output of the second pass can be final compressed bitstream 24.

Figure 3:
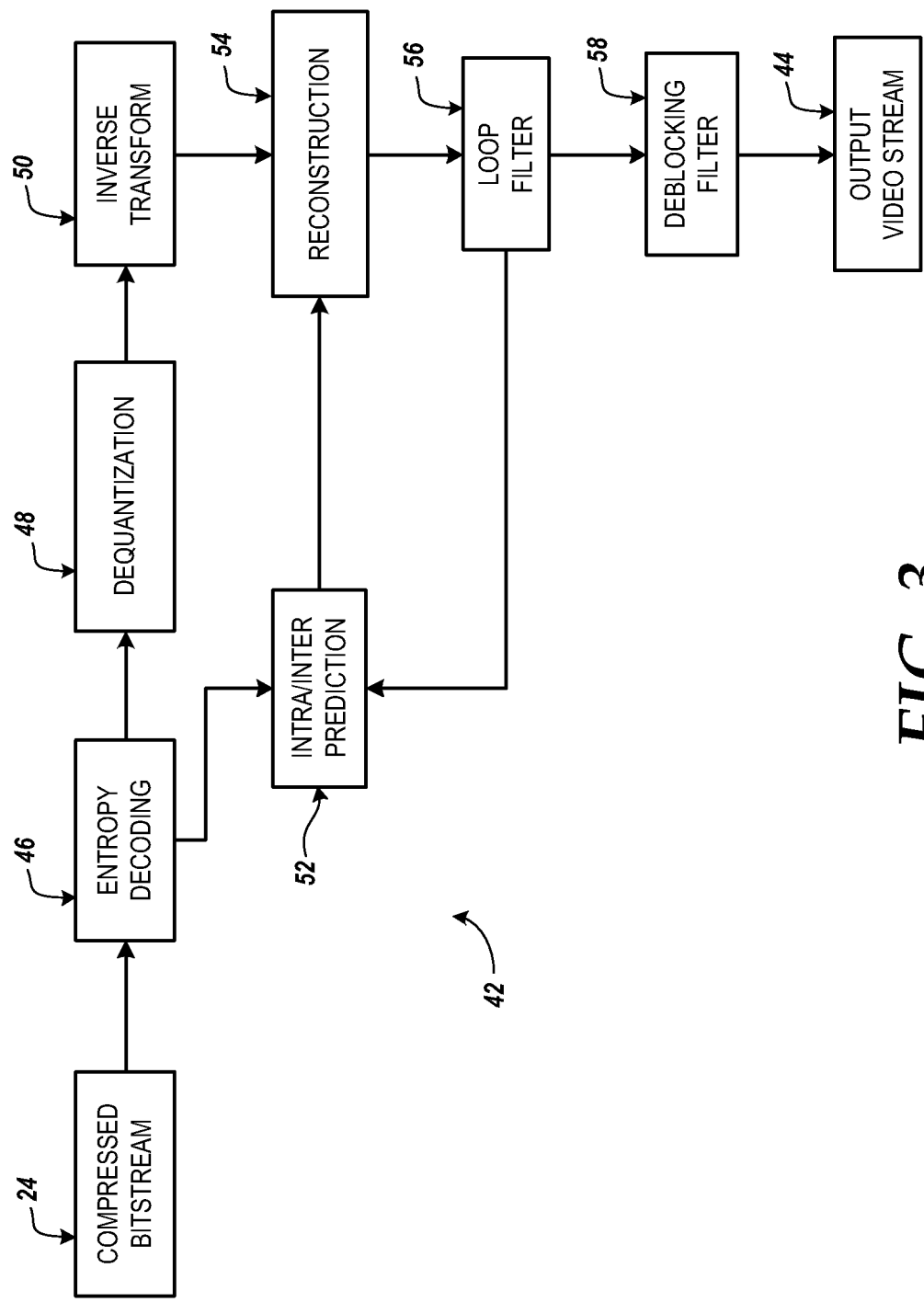
FIG. 3 is a block diagram of a video decompression system in accordance with another embodiment.

FIG. 3 is a block diagram of a video decompression system or decoder 42 to decode compressed bitstream 24. Decoder 42, similar to the reconstruction path of the encoder 20 discussed previously, includes the following stages to perform various functions to produce an output video stream 44 from compressed bitstream 24: an entropy decoding stage 46, a dequantization stage 48, an inverse transform stage 50, an intra/inter prediction stage 52, a reconstruction stage 54, a loop filter stage 56 and a deblocking filtering stage 58. Other structural variations of decoder 42 can be used to decode compressed bitstream 24.

When compressed bitstream 24 is presented for decoding, the data elements within compressed bitstream 24 can be decoded by entropy decoding stage 46 (using, for example, Context Adaptive Binary Arithmetic Decoding) to produce a set of quantized transform coefficients. Dequantization stage 48 dequantizes the quantized transform coefficients, and inverse transform stage 50 inverse transforms the dequantized transform coefficients to produce a derivative residual that can be identical to that created by the reconstruction stage in the encoder 20. Using header information decoded from the compressed bitstream 24, decoder 42 can use intra/inter prediction stage 52 to create the same prediction macroblock as was created in encoder 20. At the reconstruction stage 54, the prediction macroblock can be added to the derivative residual to create a reconstructed macroblock. The loop filter 56 can be applied to the reconstructed macroblock to reduce blocking artifacts. Deblocking filter 58 can be applied to the reconstructed macroblock to reduce blocking distortion, and the result is output as output video stream 44.

Other variations of decoder 42 can be used to decode compressed bitstream 24. For example, a decoder may produce output video stream 44 without deblocking filtering stage 58.

Referring again to encoder 20, video encoding methods compress video signals by using lossless or lossy compression algorithms to compress each frame or blocks of each frame of a series of frames. As can be implied from the description above, intra-frame coding refers to encoding a frame using data from that frame, while inter-frame coding refers to predictive encoding schemes such as schemes that comprise encoding a frame based on other so-called "reference" frames. For example, video signals often exhibit temporal redundancy in which frames near each other in the temporal sequence of frames have at least portions that match or at least partially match each other. Encoders can take advantage of this temporal redundancy to reduce the size of encoded data by encoding a frame in terms of the difference between the current frame and one or more reference frames.

Video encoders may use motion compensation based algorithms that match blocks of the frame being encoded to portions of one or more other frames. The block of the encoded frame may be shifted in the frame relative to the matching portion of the reference frame. This shift is characterized by a motion vector. Any differences between the block and partially matching portion of the reference frame may be characterized in terms of a residual. The encoder 20 may thus encode a frame as data that comprises one or more of the motion vectors and residuals for a particular partitioning of the frame. A particular partition of blocks for encoding the frame may be selected by approximately minimizing a cost function that, for example, balances encoding size with distortion to the content of the frame resulting from encoding.

As described briefly above, many video coding algorithms first partition each picture into macroblocks. Then, each macroblock can be coded using some form of predictive coding method. Some video coding standards use different types of predicted macroblocks in their coding. In one scenario, a macroblock may be one of three types: 1) Intra (I) macroblock that uses no information from other pictures in its coding; 2) Unidirectionally Predicted (P) macroblock that uses information from one preceding picture; and 3) Bidirectionally Predicted (B) macroblock that uses information from one preceding picture and one future picture.

To facilitate higher quality compressed video, it is helpful to have the best matching reference frame in order to have the smallest difference to encode, which generally results in a more compact encoding. Reference frames are based on past frames, future frames, or an intra-frame so that the encoder can find the best matching block to use in the predictive process as shown in, for example, U.S. Application Publication No. 2005/0286629 A1. More recently, reference frames based on synthesized or constructed frames that are not shown to the end user after decoding have been introduced. Such reference frames are shown in, for example, co-pending U.S. Application Publication No. 2010/0061461 A1.

Another method of constructing a reference frame can include selecting a target frame and using temporal filter 40 (FIG. 2) to remove video noise from several source frames centered on that target frame. Noise filtering can be applied by the encoder by using, for example, a motion-compensated threshold blur filter such as described in U.S. Pat. No. 6,178,205 or any other appropriate filter such as an averaging process. Removal of the video noise that differs from frame to frame makes the constructed reference frame a better predictor for multiple frames, increasing data compression of the video stream. One exemplary embodiment of temporal filter 40 for creation of alternate reference frames can designate a set of frames defined by a filter length that is generally temporally centered about a reference frame. Then, weightings can be applied to individual macroblocks and pixels of the set of frames based on the temporal correlation between the frames and the reference frame.

Regardless of the method used to create these reference frames, such constructed reference frames are referred to herein as "alternate reference frames." The alternate reference frames are constructed from macroblocks, which are referred to herein as "alternate reference blocks." In addition to these alternate reference frames, two other types of reference frames are used in prediction, particularly the example described below. The first is the last frame before the current frame to be encoded. The second is a golden frame, which is most simply defined as one frame's worth of decompressed data from an arbitrarily distant past. As frames 14 in video sequence 12 progress, a new golden frame can be designated, often but not necessarily periodically. Alternatively, parts of the golden frame are updated as frames 14 in video sequence 12 progress.

A block and/or frame can be encoded using any one of these reference frames so as to minimize the cost of encoding a frame or block where the cost is, for example, a comparison of bit count to reconstruction accuracy performed by techniques known in the art. An alternate reference frame can, however, end up being exactly or almost exactly the same as the last or golden frame. That is, the creation of the alternate reference frame sometimes creates areas of prediction that are no better for any frame than the last or golden frame's predictor for the areas. Such an alternate reference frame is not an ideal predictor—that is, it is not useful for those areas. Embodiments described herein describe a mechanism for creating a useful "secondary" reference frame in such situations. Namely, blocks of an alternate reference frame that provide prediction no better for a frame than the last or golden frame are replaced with or supplemented by predictors that provide a better alternative for a specified number of frames in a sequence of frames. Herein, these are called secondary alternate reference blocks.

Figure 4:
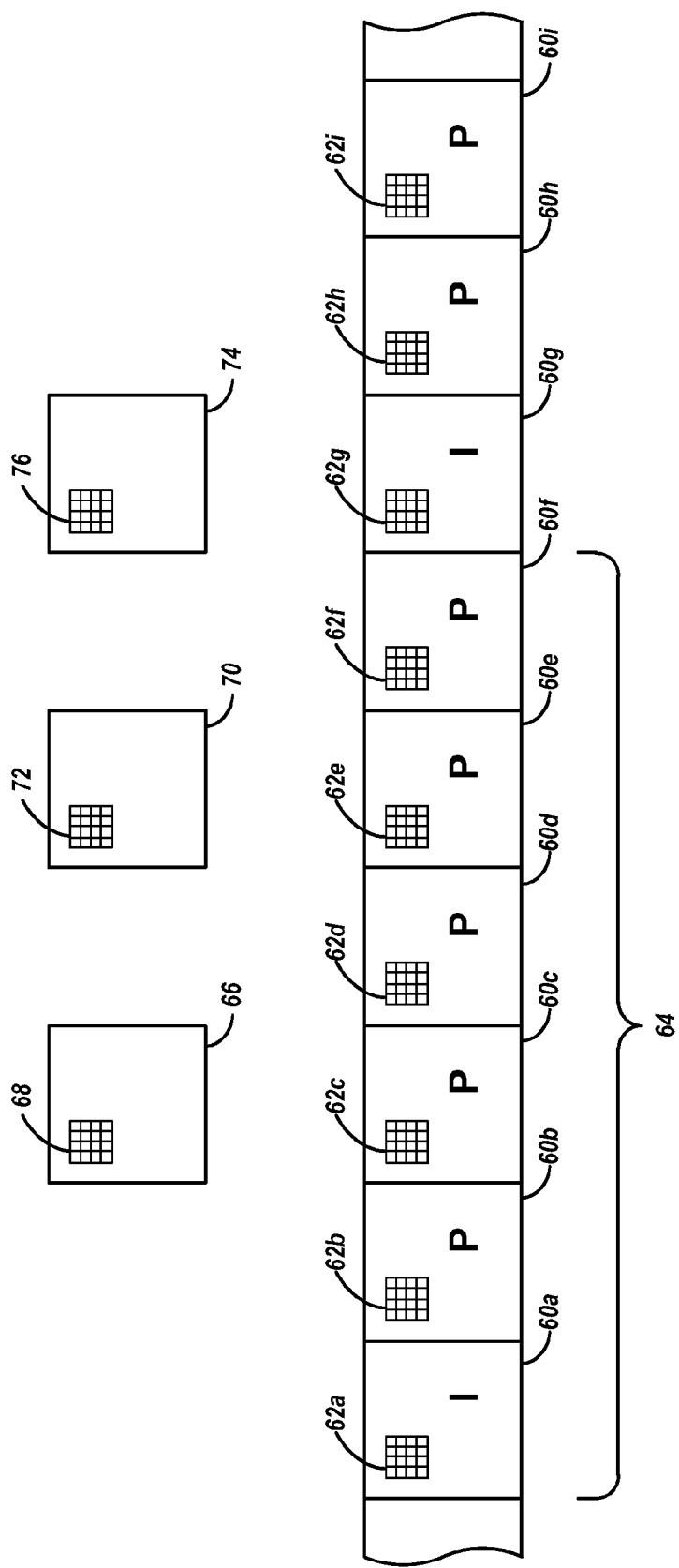
FIG. 4 is a schematic diagram illustrating an exemplary series of frames created by the encoder shown in FIG. 2 along with their associated reference frames.

Such a mechanism is illustrated first with reference first to FIG. 4, which is a schematic diagram illustrating an exemplary series of frames created by the encoder shown in FIG. 2 along with their associated reference frames. In this example, the series of frames includes by example nine frames 60a-60i. An "I" in frame 60a and in frame 60g indicates that blocks of the respective frame are to be intra-coded, while a "P" in frames 60b-60f, 60h and 60i indicates that blocks of the frame are to be inter-coded using one of the last frame (i.e., the next previous frame), alternate reference frame 66 and golden frame 74. While frames including blocks that are bi-directionally encoded can be used with embodiments of the present invention, this example does not include them. The selection of coding modes and the creation of alternate reference frame 66 could be performed by encoder 20 during a first pass as described previously.

For each frame 60a-60i, macroblocks 62a-62i are identified, which are located at the same corresponding spatial position in each frame. Spatial correspondence, as referred herein, means a pixel, macroblock or other partition has the same or corresponding position from one frame to another, and spatial corresponding blocks are used in the example below. However, the blocks used for the comparisons and calculations are not limited to blocks in the respective frames that spatially correspond to each other. The spatial positions of the selected blocks may be different because of motion compensation or other predictive techniques (such as using a constructed reference frame of a different size from the frames to be encoded). Accordingly, the comparisons occur between blocks that are associated with each other, whether that includes spatial correspondence or correspondence with motion compensation and/or consideration of the predictive technique. Motion compensation, for example, can be used selectively where the target macroblock was encoded in a preceding pass with an intra mode, an inter mode with a non zero motion vector or with 0,0 inter-frame coding where the correlation is below a predetermined threshold.

An alternate reference period 64 is also shown in FIG. 4 and defines the sequence of frames over which alternate reference frame 66 is available for use in prediction. For example, where temporal filter 40 is used to create alternate reference frame 66 through application of a blurring function, alternate reference period 64 is defined by a filter set used to create that alternate reference frame 66. In this instance, alternate reference period 64 includes frames 60a-60f and macroblocks 62a-62f and corresponds to an I-frame sequence (e.g., a sequence of frames starting with an I-frame and including frames up to but not including the next I-frame in the sequence). However, alternate reference period 64 may be defined as including any number of frames, including a larger number or a smaller number of frames as compared to this example. Alternate reference period 64 may or may not start with an I-frame.

Alternate reference frame 66 includes an alternate reference block 68 spatially corresponding to macroblocks 62a-62f. Golden frame 74 includes a golden frame reference block 76 spatially corresponding to macroblocks 62a-62f.

A secondary alternate reference frame 70 is also shown next to alternate reference frame 66. Similar to alternate reference frame 66, secondary alternate reference frame 70 includes a secondary alternate reference block 72 spatially corresponding to macroblocks 62a-62f. Alternately, a secondary alternate reference frame 70 may not be completely created, but only one or more secondary alternate reference blocks such as secondary alternate reference block 72 may be created. The creation of secondary alternate reference blocks is detailed further hereinafter. For application to inter-prediction encoding and decoding, if a secondary alternate reference block is created, it will replace the spatially corresponding alternate reference block in the alternate reference frame 66. But alternatively, secondary alternate reference blocks may be stored and used as predictors separately from the predictor blocks of alternate reference frame 66.

Figure 5:
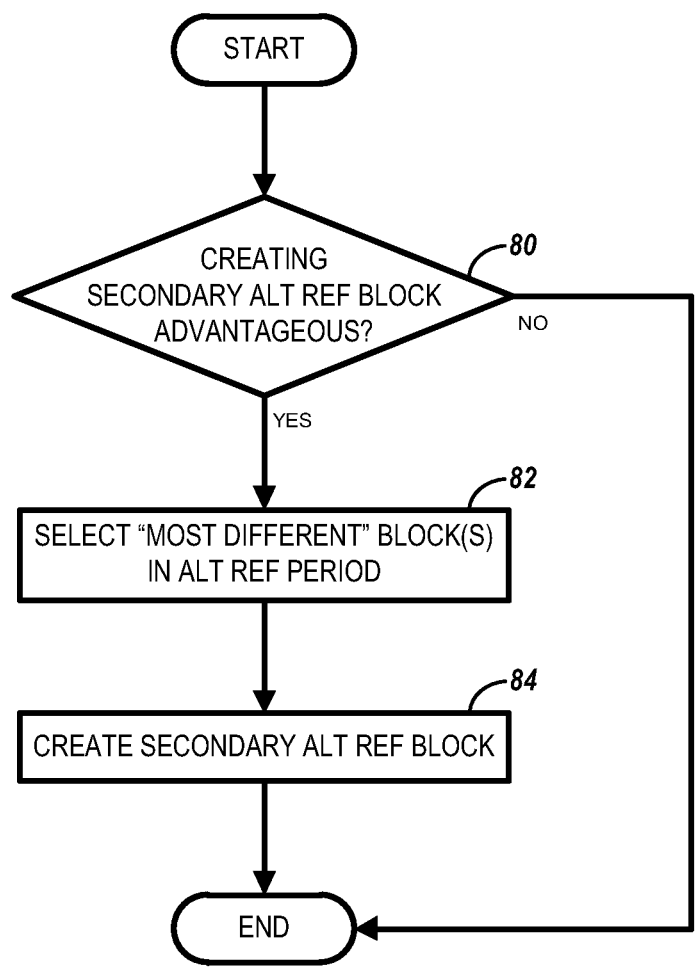
FIG. 5 is a simplified flow chart of a method of creating a secondary alternate reference macroblock using the encoder shown in FIG. 2.
Figure 6A:
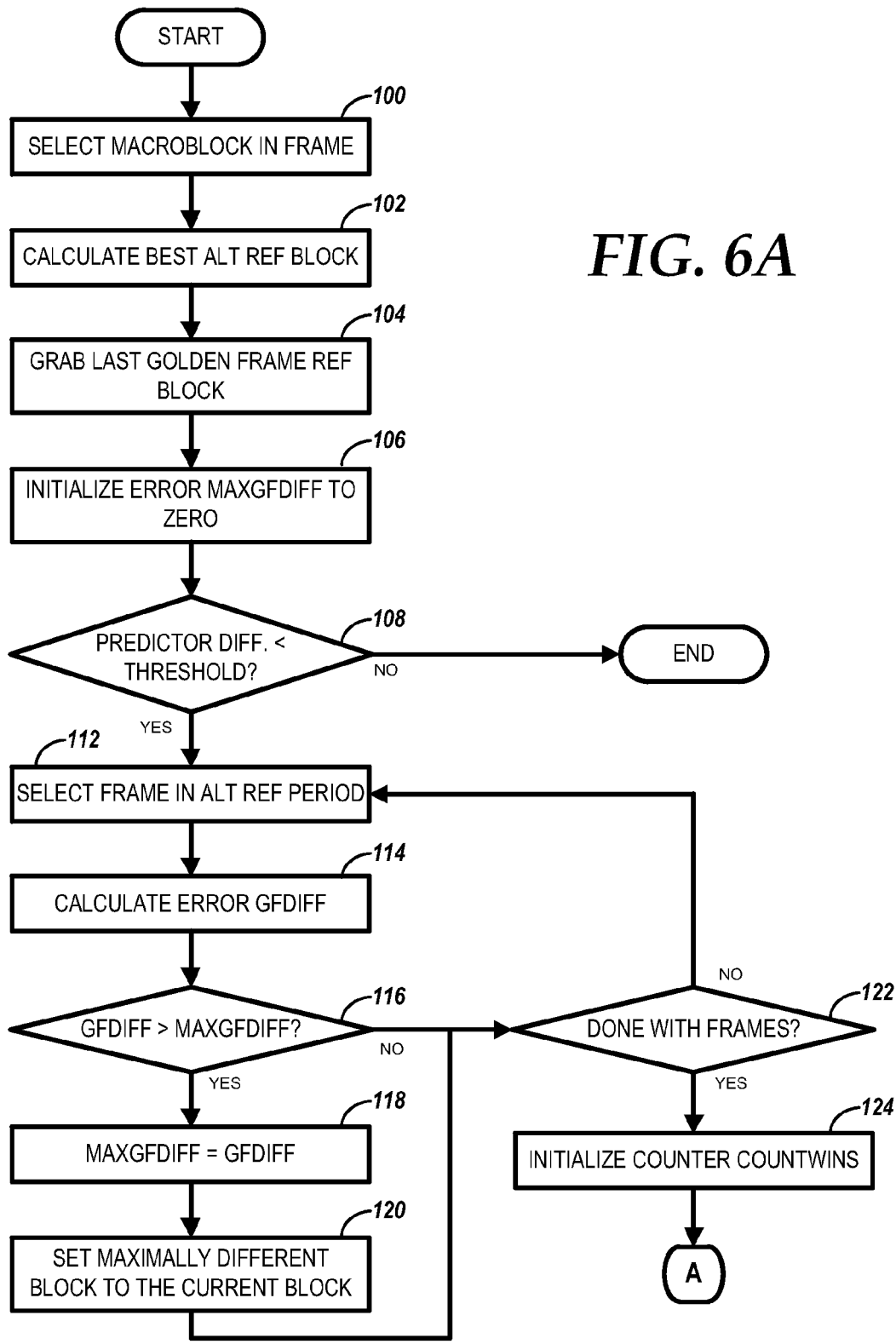
FIGS. 6A and 6B is a flow chart illustrating an exemplary embodiment of the method of creating a secondary alternate reference macroblock shown in FIG. 5.
Figure 6B:
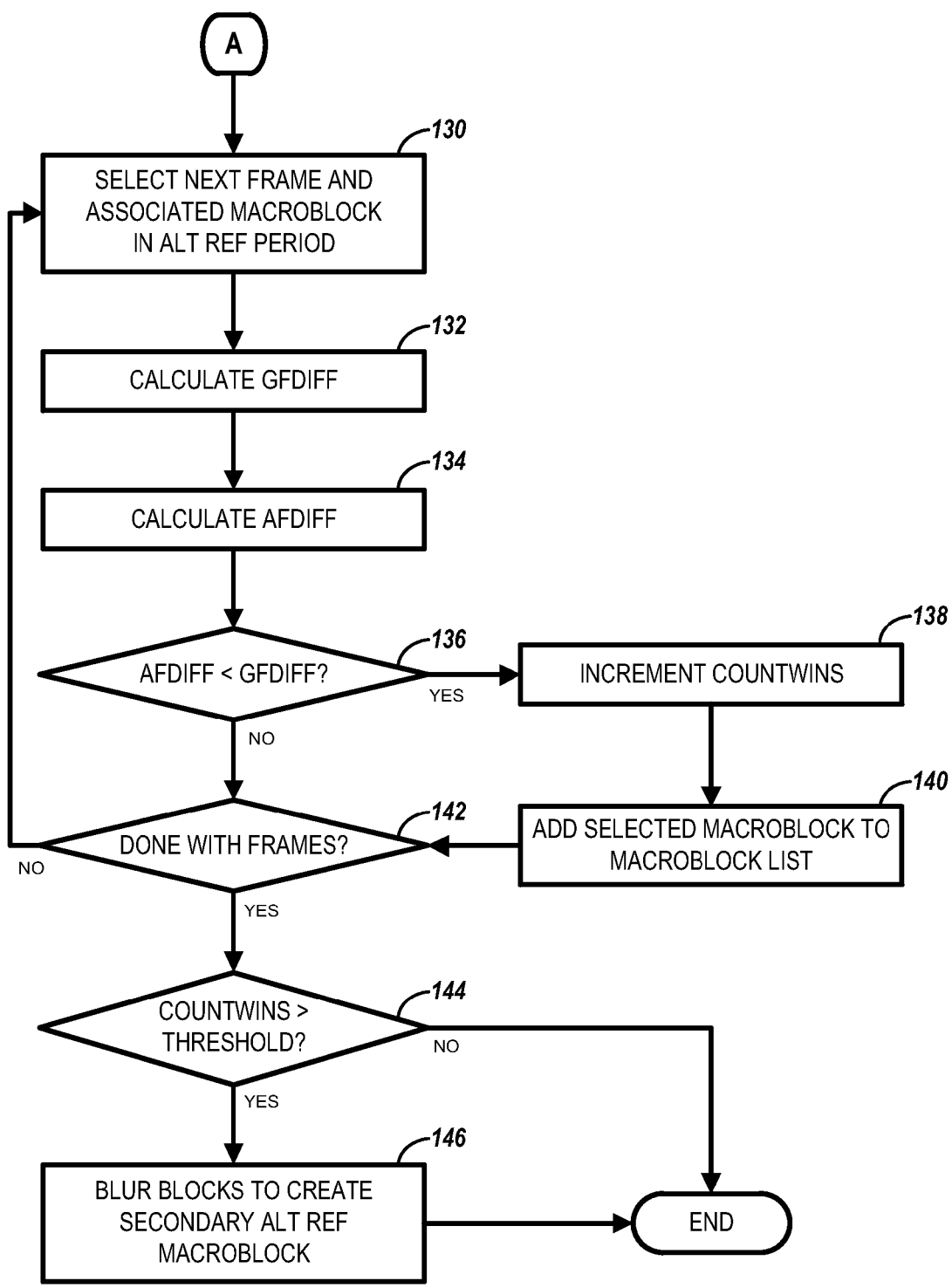

FIG. 5 is a simplified flow chart of a method of creating a secondary alternate reference macroblock using the encoder shown in FIG. 2, and FIGS. 6A and 6B are a flow chart illustrating an exemplary embodiment of the method of creating a secondary alternate reference macroblock shown in FIG. 5. The method shown in FIG. 5 broadly describes the basic steps, while FIGS. 6A and 6B show additional details implementing the basic steps. The first step in the method as shown in FIG. 5 is to determine whether the creation of a secondary alternate reference block is advantageous (80) by comparing an alternate reference block with at least one predictor block for a block to be encoded. For example, when encoding block 62b, creating secondary alternate reference block 72 may advantageous if alternate reference block 68 is substantially similar to golden frame reference block 76. If a secondary alternate reference block 72 would not be advantageous, the method ends with respect to analyzing the current alternate reference block 68.

However, if a secondary alternate reference block 72 would be advantageous (80), then the "most different" block(s) in alternate reference period 64 are selected (82). The term "most different" may encompass a number of different algorithms capable of selecting one or more blocks within alternate reference period 64 that are less similar to alternate reference block 68 than those that are not selected. For example, a fixed number of the least similar blocks may be selected. Alternatively, the half of the blocks in the alternate reference period 64 that are most dissimilar could be selected.

Once the "most different" block(s) are selected (82), then any selected blocks are combined to create secondary alternate reference block 72 (84). This combination could be accomplished by blurring. For example, blurring may be performed by averaging each spatially corresponding individual pixel from each of the selected blocks. The blur may also utilize a weighted average where certain selected blocks may have a higher weighting than others. Other ways of combining the blocks, if desirable, can be used. After secondary alternate reference block 72 is created (84), the method ends. Secondary alternate reference block 72 replaces original alternate reference block 68, or alternatively, secondary alternate reference block 72 is added as an additional possible predictor block for blocks to be encoded. As explained in detail below, this process can be repeated for each block of alternate reference frame 66 and/or for each block of a frame to be encoded.

In the process shown in FIG. 6A, it is first determined whether the difference between blocks of the alternate reference frame and the golden frame for a block to be encoded is sufficiently low to consider creating a secondary alternate reference block. Then, a block of a sequence of blocks associated with the alternate reference frame is set as a maximally different block for further processing as shown in FIG. 6B to determine whether to create the secondary alternate reference block and which blocks in the sequence to use to create the secondary alternate reference block. Hereinafter, the alternate reference block is called an "alt ref block," and the secondary alternate reference block is called "secondary alt ref block."

As shown in FIG. 6A, the first step is to select a macroblock (the "target macroblock") in the current frame being processed (the "target frame") (100). Here, for example, the target macroblock could be macroblock 62b in target frame 60b. An alt ref block is then calculated for the target macroblock (102). The alt ref block may be, for example, created using the exemplary embodiment of temporal filter 40 disclosed above. The alt ref block may also be created using other filters or algorithms. For example, the alt ref block could be created by compositing blocks from several past and future frames, with appropriate motion compensation, or it could contain arbitrary elements such as graphic overlays. Also note that, while calculating the best alt ref block is described as occurring after selecting the target macroblock, calculation of the alternate reference frame and/or a number of alternative reference blocks could be performed earlier such that processing at this point (102) merely selects the alt ref block. Where alternate reference frame 66 exists, for example, alt ref block 68 is selected (102) as it is the spatially corresponding block to target macroblock 62b.

Once the alt ref block is created/selected (102), the golden frame reference block associated with the target block is selected (104). In this example, this would be golden frame reference block 76, as it is the block in golden frame 74 that spatially corresponds with macroblock 62b.

After the golden frame reference block is selected (104), processing initializes a variable maxgfdiff to zero (106). The variable maxgfdiff is also called error maxgfdiff and its use is described in more detail hereinafter.

The difference between the alt ref block and the golden frame reference block is then calculated and compared to a threshold (108). The difference may be calculated using the sum of absolute differences (SAD) algorithm based on a pixel-by-pixel comparison. The difference may be alternatively be calculated using other methods, including but not limited to the sum of absolute transformed differences (SATD) or the sum of squared differences (SSD). The threshold is an arbitrary number that may be a constant or set by the encoder 20 using various criteria, including but not limited to block size and the difference algorithm used. Once calculated, if the difference is greater than the threshold, then the process ends and no alternative to the alt ref block is created for use by encoder 20 for spatially corresponding target blocks in an alternate reference period, in this example at least blocks 62b-62f in alternate reference period 64.

If instead the difference between the alt ref block and the golden frame reference block is less than the threshold (108), processing selects a first available frame within the frames of interest (112), generally those in the alternate reference period, to continue the process of determining a secondary alternate reference block. A macroblock that spatially corresponds with the target macroblock is selected from the selected frame for the next processing steps.

Once the macroblock is selected from the first available frame (112), a difference, error gfdiff, between the golden frame reference block and the selected macroblock is calculated (114). As disclosed with respect to the calculation of differences above (108), the difference may be calculated here using SAD or other methods. Error gfdiff is then compared to error maxgfdiff (116).

If error gfdiff is greater than error maxgfdiff (116), then error maxgfdiff is set as the current value of error gfdiff (118). The currently selected macroblock is then selected as the maximally different block (120). If instead error gfdiff is less than error maxgfdiff (116), error maxgfdiff remains unchanged. Whether error maxgfdiff is updated or not, processing advances to determine whether there are additional frames available in the alternate reference period (122). If there are additional frames available (122), the next frame in the alternate reference period and its macroblock spatially corresponding to the target macroblock are selected (112) to repeat the steps of calculating error gfdiff (114) and comparing it to error maxgfdiff (116) to determine whether to update error maxgfdiff and the maximally different block. Once no additional frames are available (122), processing initializes a counter variable, countwins, to zero (124). At the end of this processing, the maximally different block of all spatially corresponding blocks in the sequence of frames is known.

Now with reference to FIG. 6B, processing performs several steps to determine how many and for which of the macroblocks a new alt ref block would be better than the existing alt ref block. This is performed in FIG. 6B by comparing the blocks in the sequence of frames that are associated with the target macroblock with both the golden frame reference block and the maximally different block. As with the above description of the processing, the association between the blocks used in this example is that the blocks spatially correspond to each other, but the selection of blocks for the comparisons are not so limited in practice.

That is, the first available frame within the sequence of frames is again selected, as is the macroblock in that frame that spatially corresponds to the target macroblock (130).

Once a macroblock is selected (130), error gfdiff variable is again calculated for the selected macroblock (132). As mentioned above, error gfdiff variable is calculated as the difference between the golden frame reference block and the currently-selected macroblock using SAD or other methods. Next, a variable afdiff is calculated as the difference between the maximally different block and the currently-selected macroblock (134). As described previously, the difference may be calculated using SAD or other methods.

Variable afdiff is next compared with error gfdiff (136). If the value of variable afdiff is less than the value of error gfdiff, counter countwins variable is incremented (138). The current selected macroblock is then added to a list of macroblocks that can be used to create the secondary alternate reference block (140), where the list preferably already includes the maximally different block. If instead the value of variable afdiff is greater than or equal to the value of error gfdiff (136), processing advances without incrementing counter countwins and adding to the list.

Regardless of whether variable afdiff is less than error gfdiff or not (136), a check is made as to whether there are any additional frames available to process in the alternate reference period (142). Until there are no additional frames (142), processing continues by selecting the next frame and associated macroblock (130), calculating error gfdiff and variable afdiff (132, 134) and comparing them (136) to determine whether or not to increment counter countwins (138) and to add the current macroblock to the list (140).

If no additional frames are available (142), the value of counter countwins is compared to a threshold value (144). The threshold value is an arbitrary number that is used to determine whether creating the secondary alt ref block should be done or not. That is, if the number of blocks is not sufficiently high, as represented by counter countwins, the additional bits needed to encode yet another alt ref block in the bitstream are not considered to be worth the benefit of having that alt ref block. The threshold value may be a constant, such as 2 blocks, or be set by the encoder 20 using various criteria, including but not limited to encoder quality settings and previous prediction results.

If the value of counter countwins is less than or equal to the threshold value (144), the process ends. No secondary alt ref block is created, and the unaltered alt ref block remains available as one option for encoder 20 to encode blocks. In contrast, if the value of counter countwins is greater than the threshold value (144), the selected blocks in the list are combined, such as by blurring or in other ways as described previously, to create the secondary alt ref block (146). For example, the maximally different block could be used as the center block of a plurality of selected blocks in a process using a temporal filter. The process then ends.

As mentioned briefly above, the secondary alt ref block so created can replace the spatially corresponding alt ref block originally selected (102). Alternatively, the secondary alt ref block could be added as one more possible predictor block for blocks to be encoded. Note that once the process is completed for a target macroblock, it does not have to be repeated for any spatially corresponding block in the sequence of frames considered. The sec alt reference block was created in consideration of these blocks and is available to them for encoding.

The process above can be repeated for each block or only certain blocks of the original alternate reference frame for the alternate reference period if the target macroblock does not encompass the entirety of the target frame.

The preceding technique can include optional features. For example, although all of the blocks in the list are used to create the secondary alt ref block (146), the worst two or three could be used, such as by averaging. Alternatively, the worst block (i.e., the maximally different block) could be used alone or even omitted from the list. Further, the alt ref block could be replaced only after trying the new secondary alt ref block and determining that it provides better prediction for blocks over several frames, such as two or three frames.

The process described above is implemented in two-pass encoder 20 as described. However, it could be implemented in a single-pass encoder where a number of input frames are buffered in the encoder before that encoder produces a first compressed frame. The information collected during the first pass of a two-pass encode process (e.g., encoding modes of macroblocks) can be calculated over the set of buffered frames rather than the entire clip as it is in the two-pass encoder.

The operation of encoding can be performed in many different ways and can produce a variety of encoded data formats. The above-described embodiments of encoding or decoding may illustrate some exemplary encoding techniques. However, in general, encoding and decoding are understood to include any transformation or any other change of data whatsoever.

Encoder 20 and/or decoder 42 are implemented in whole or in part by one or more processors which can include computers, servers, or any other computing device or system capable of manipulating or processing information now-existing or hereafter developed including optical processors, quantum processors and/or molecular processors. Suitable processors also include, for example, general purpose processors, special purpose processors, IP cores, ASICS, programmable logic arrays, programmable logic controllers, microcode, firmware, microcontrollers, microprocessors, digital signal processors, memory, or any combination of the foregoing. In the claims, the term "processor" should be understood as including any the foregoing, either singly or in combination. The terms "signal" and "data" are used interchangeably.

Encoder 20 and/or decoder 42 also include a memory, which can be connected to the processor through, for example, a memory bus. The memory may be read only memory or random access memory (RAM) although any other type of storage device can be used. Generally, the processor receives program instructions and data from the memory, which can be used by the processor for performing the instructions. The memory can be in the same unit as the processor or located in a separate unit that is coupled to the processor.

Figure 7:
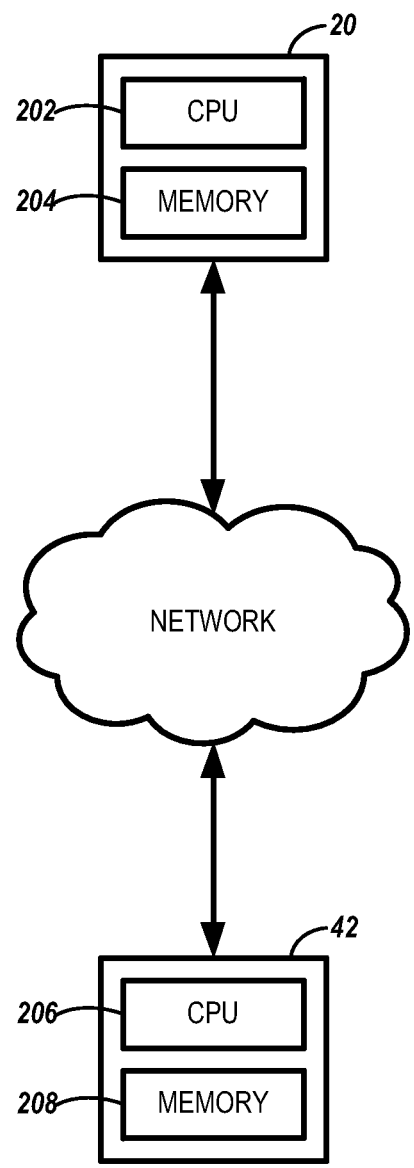
FIG. 7 is a block diagram of computer systems implementing the video compression system and video decompression system described herein.

For example, encoder 20 can be implemented using a general purpose processor with a computer program that, when executed, carries out any of the respective methods, algorithms and/or instructions described herein. FIG. 7 illustrates one suitable implementation in which encoder 20 is implemented in a general purpose computer including a central processing unit (CPU) 202 and random access memory (RAM) 204. Decoder 42 is implemented using a general purpose computer including a central processing unit (CPU) 206 and random access memory (RAM) 208. In addition or alternatively, for example, a special purpose processor can be utilized which can contain specialized hardware for carrying out any of the methods, algorithms and/or instructions described herein. Portions of encoder 20 or decoder 42 do not necessarily have to be implemented in the same manner. Thus, for example, intra/inter prediction stage 26 can be implemented in software whereas transform stage 28 can be implemented in hardware. Portions of encoder 20 or portions of decoder 42 may also be distributed across multiple processors on the same machine or different machines or across a network such as a local area network, wide area network or the Internet.

Encoder 20 and decoder 42 can, for example, be implemented in a wide variety of configurations, including for example on servers in a video conference system. Alternatively, encoder 20 can be implemented on a server and decoder 42 can be implemented on a device separate from the server, such as a hand-held communications device such as a cell phone. In this instance, encoder 20 can compress content and transmit the compressed content to the communications device, using the Internet for example, as shown in FIG. 7. In turn, the communications device can decode the content for playback. Alternatively, the communications device can decode content stored locally on the device (i.e. no transmission is necessary). Other suitable encoders and/or decoders are available. For example, decoder 42 can be on a personal computer rather than a portable communications device.

The operations of encoder 20 or decoder 42 (and the algorithms, methods, instructions etc. stored thereon and/or executed thereby) can be realized in hardware, software or any combination thereof. All or a portion of embodiments of the present invention can take the form of a computer program product accessible from, for example, a computer-usable or computer-readable medium. A computer-usable or computer-readable medium can be any device that can, for example tangibly contain, store, communicate, and/or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video signal having at least one frame with at least one block of pixel data, comprising:
    A) selecting a target block in a target frame to be compressed using a processor;
    B) obtaining a first alternate reference block associated with the target block, the first alternate reference block available for inter prediction of blocks of a sequence of frames and the sequence of frames defining an alternate reference period;
    C) comparing the first alternate reference block to a predictor block associated with the target block to determine whether to create a secondary alternate reference block, the predictor block being an inter predicted block generated based on a frame other than the target frame; and
    D) when a difference between the first alternate reference block and the predictor block is less than a threshold, selectively creating the secondary alternate reference block by:

selecting certain blocks from the sequence of frames that are more different from the first alternate reference block than other non-selected blocks from the sequence of frames; and creating the second alternate reference block using the selected blocks, the secondary alternate reference block available for inter prediction of the blocks of the sequence of frames.

2. The method of claim 1, wherein selecting certain blocks from the sequence of frames comprises:

comparing those blocks of the sequence of frames associated with the predictor block to select a block as a maximally different block that is the block having data more different from the predictor block than that of the remaining blocks;

opening a list of blocks including the maximally different block;

comparing remaining blocks of the sequence of frames associated with the predictor block to the predictor block and to the maximally different block; and adding any block of the remaining blocks to the list of blocks when that block is more similar to the maximally different block than the predictor block.

3. The method of claim 2 wherein selectively creating the second alternate reference block comprises:

comparing a number of blocks in the list of blocks with a threshold value; and creating the second alternate reference predictor using at least certain blocks of the list of blocks as the selected blocks when the number of blocks is greater than the threshold value.

4. The method of claim 2, further comprising:

creating a second alternate reference frame for the target frame by combining the list of blocks to replace the alternate reference block in a first alternate reference frame.

5. The method of claim 2 wherein comparing remaining ones of those blocks of the sequence of frames associated with the predictor block to the predictor block and to the maximally different block comprises:

calculating a difference between the predictor block and a respective one of the remaining blocks;

calculating a difference between the maximally different block and the respective one of the remaining blocks; and comparing the differences.

6. The method of claim 5 wherein adding any block of the remaining blocks to the list of blocks comprises:

adding respective one of the remaining blocks to the list of blocks when the difference between the predictor block and the respective one of the remaining blocks is greater than the difference between the maximally different block and the respective one of the remaining blocks.

7. The method of claim 5 wherein calculating the difference between the predictor block and the respective one of the remaining blocks comprises calculating a sum of the absolute values of differences between values of pixels in the predictor block and values of pixels in the respective one of the remaining blocks; and wherein calculating the difference between the maximally different block and the respective one of the remaining blocks comprises calculating a sum of the absolute values of differences between values of pixels in the maximally different block and the values of the pixels in the respective one of the remaining blocks.

8. The method of claim 7 wherein adding any block of the remaining blocks to the list of blocks comprises:

adding respective one of the remaining blocks to the list of blocks when the difference between the predictor block and the respective one of the remaining blocks is greater than the difference between the maximally different block and the respective one of the remaining blocks.

9. The method of claim 1, further comprising:

creating the first alternate reference block.

10. The method of claim 1, further comprising:

performing steps A), B), C) and D) for each block in the target frame.

11. The method of claim 1 wherein comparing the first alternate reference block to the predictor block comprises calculating a difference between the first alternate reference block and the predictor block by calculating a sum of the absolute values of differences between values of pixels in the first alternate reference block and values of pixels in the predictor block.

12. The method of claim 1, further comprising:

encoding the target block using the second alternate reference block.

13. The method of claim 1 wherein the target frame is one of the sequence of frames.

14. The method of claim 1 wherein the predictor block is a block in a golden frame that spatially corresponds to the target block.

15. The method of claim 1 wherein the predictor block is generated from one of a frame of the sequence of frames encoded before the target frame or a golden frame.

16. An apparatus for compressing a video signal having at least one frame with at least one block of pixel data, comprising:

A) means for selecting a target block in a target frame to be compressed;

B) means for obtaining a first alternate reference block associated with the target block, the first alternate reference block available for prediction of blocks of a sequence of frames and the sequence of frames defining an alternate reference period;

C) means for comparing the first alternate reference block to a predictor block associated with the target block to determine whether to create a secondary alternate reference block, the predictor block being an inter predicted block based on a frame other than the target frame; and D) means for selectively creating the secondary alternate reference block when a difference between the first alternate reference block and the predictor block is less than a threshold, the selectively creating means including:

means for selecting certain blocks from the sequence of frames that are more different from the first alternate reference block than other non-selected blocks from the sequence of frames; and means for creating the second alternate reference block using the selected blocks, the secondary alternate reference block available for prediction of the blocks of the sequence of frames.

17. An apparatus for compressing a video signal having at least one frame with at least one block of pixel data, comprising:

a memory; and a processor configured to execute instructions stored in the memory to:

select a target block in a target frame to be compressed;

obtain a first alternate reference block associated with the target block, the first alternate reference block available for inter prediction of blocks of a sequence of frames and the sequence of frames defining an alternate reference period;

compare the first alternate reference block to a predictor block associated with the target block to determine whether to create a secondary alternate reference block, the predictor block being an inter predicted block based on a frame other than the target frame; and when a difference between the first alternate reference block and the predictor block is less than a threshold:

compare those blocks of the sequence of frames associated with the predictor block to select a block that is maximally different from the predictor block;

open a list of blocks including the maximally different block;

compare remaining blocks of the sequence of frames associated with the predictor block to the predictor block and to the maximally different block;

add any block of the remaining blocks to the list of blocks when that block is more similar to the maximally different block than the predictor block; and create the second alternate reference block using the at least certain blocks of the list of blocks when a number of blocks in the list of blocks is higher than a predetermined value, the secondary alternate reference block available for inter prediction of the blocks of the sequence of frames.

18. The apparatus of claim 17 wherein the target frame is one of the sequence of frames and the predictor block is a block in a golden frame that spatially corresponds to the target block.

\* \* \* \* \*

UNITED STATES PATENT AND TRADEMARK OFFICE
CERTIFICATE OF CORRECTION

PATENT NO.       : 8,638,854 B1                            Page 1 of 1
APPLICATION NO.  : 13/081668
DATED            : January 28, 2014
INVENTOR(S)      : James Bankoski et al.

It is certified that error appears in the above-identified patent and that said Letters Patent is hereby corrected as shown below:

On the title page, item (56) "Other Publications", Column 2, Line 5, "Amendement" should be "Amendment".

Signed and Sealed this
Twenty-second Day of April, 2014

Michelle K. Lee
*Deputy Director of the United States Patent and Trademark Office*